Aug. 23, 1966  G. R. SKEEN ETAL  3,268,039

FRICTION BRAKE FOR AN INTERMITTENT FEED MECHANISM

Filed Aug. 24, 1964

INVENTORS
GARY R. SKEEN
CARL PETERSON
BY
*Max Schwartz*
ATTORNEY

United States Patent Office 3,268,039
Patented August 23, 1966

3,268,039
FRICTION BRAKE FOR AN INTERMITTENT
FEED MECHANISM
Gary R. Skeen, Cranston, and Carl Peterson, Barrington, R.I., assignors to Carl G. Peterson Co., East Providence, R.I., a corporation of Rhode Island
Filed Aug. 24, 1964, Ser. No. 391,413
6 Claims. (Cl. 188—264)

Our present invention relates to the metal working art and more particularly to a novel brake device for an intermittent feed mechanism.

The principal object of the present invention is to provide a friction brake for a high speed intermittent feed mechanism.

Another object of the present invention is to provide a brake mechanism which will produce a uniform torque on the roller feed shaft.

A further object of the present invention is to provide a friction brake mechanism in which the brake drum is contacted uniformly across its area by the brake band.

Another object of the present invention is to provide a brake mechanism of the metal to metal type having a novel oiling device for controlling the temperature.

With the above and other objects and advantageous features in view, our invention consists of a novel arrangement of parts more fully disclosed in the detailed description following in conjunction with the accompanying drawings and more particularly defined in the appended claims.

Material such as metal in strip form is fed to a punch press by an intermittent feed mechanism. This usually consists of a pair of rollers urged towards each other and intermittently driven from an eccentric off the drive shaft of the power press. Thus, while the die is moving upwardly the metal is being fed. When the die moves downwardly to punch and stamp the metal, the feed is at a standstill. It is necessary that the feed be accurate, especially in multiple die operations. Modern presses are operated at higher and higher speeds, moving from 250 to 1000 strokes per minute. The higher the speed the more inertia there is present in the moving parts.

It has therefore become necessary to provide the high speed press feed device with braking mechanisms to prevent inertial movement. One or all of the shafts of the feed device may therefore be provided with a friction brake for holding the feed against all movement except that imparted by the press drive. Most of these brake devices comprise a cylinder surrounded by a brake band made of a fabric material very similar to a standard automotive brake. This type of brake has become very unsatisfactory at the higher speeds. It has been found that as the temperature of the brake increases with use the torque on the shaft will vary. It is therefore necessary to continually adjust the pressure on the brake in use. Furthermore, the fabric is actually touching the brake drum in spots instead of evenly overall. The wear is uneven and the braking action is also uneven.

Applicants have found that the best combination for a high speed feed device is a metal to metal friction brake. This means a brake drum or cylinder made of hardened steel and a bronze alloy brake band mounted thereon. Metal to metal brakes have been heretofore used for other purposes. However, metal to metal brakes have a tendency to heat to very high temperatures and in most instances they are provided under an oil bath. Applicants have therefore provided a metal to metal brake construction having an oiling device that keeps the temperature of the brake below safe limits.

Figure 1:
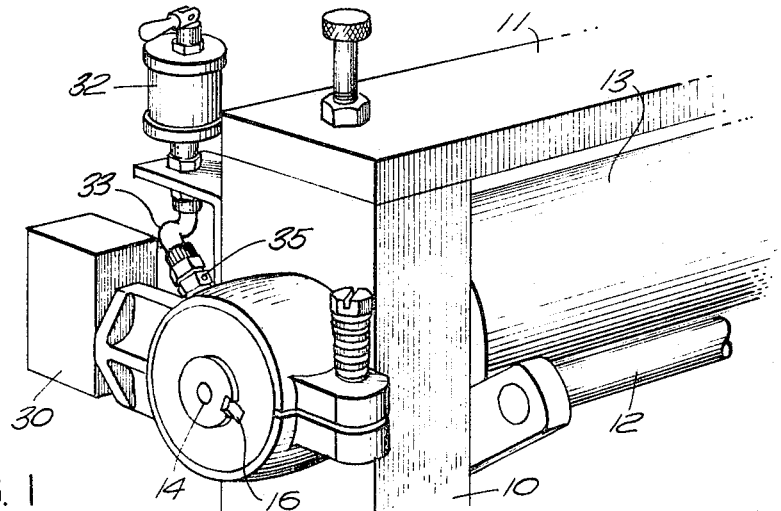
FIG. 1 is a perspective view of a brake of the present invention mounted on a roller feed.

Referring more in detail to the drawings illustrating our invention, FIG. 1 shows a brake of the present invention mounted on the shaft of the top roller of a conventional feed device. The feed is usually mounted in a rectangular frame having end walls 10 and a top wall 11 together with a conventional lifting mechanism 12. The top roller 13 is mounted on a shaft 14 which extends outwardly through the end wall 10 as shown in FIG. 1. A brake drum 15 in the form of a polished steel cylinder is mounted on the extended end of the shaft 14 and keyed thereto at 16. The cylinder 15 is locked to the shaft 14 by means of an Allen head screw 17 in a radial opening 18 in the cylinder 15. The Allen head screw is designed to extend approximately ¼ inch below the perimeter of the cylinder 15 as shown in FIG. 2.

Figure 3:
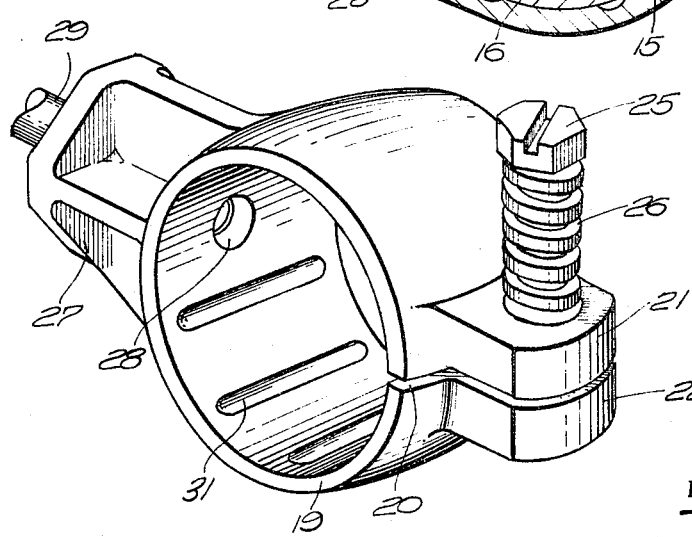
FIG. 3 is a perspective view of the brake band.

We now provide a brake band 19 illustrated in FIG. 3, made of a bronze alloy and adapted to fit tightly around the cylinder 15. The band 19 is broad and annular in shape and is cast with a split 20 adjacent one side, and is provided with complementary lugs 21 and 22 extending from each side of the split. The lower drum lug 22 is provided with a threaded opening 23 and the complementary upper lug 21 is provided with an aligned opening 24 of larger diameter than the opening 23. An elongated bolt 25 is adapted to pass freely through the opening 24 and thread into the lower opening 23. A strong flat coiled spring 26 is positioned between the head of the bolt 25 and the upper surface of the upper lug 21. In this arrangement, tightening the bolt 25 will cause the spring to compress against the upper lug 21 and push it downwardly against the lower lug 22 into the gap 20 and thus tightening the band 19 around the drum 15. The brake drum is mounted by providing an integral extended portion 27 on the side opposite the lugs 21 and 22. The extended potrion 27 is provided with a passageway 28 into which a shaft 29 extends. The shaft 29 is mounted at its other end at a universal joint, not shown, in a block 30 to provide a flexible anchorage for the brake.

Figure 2:
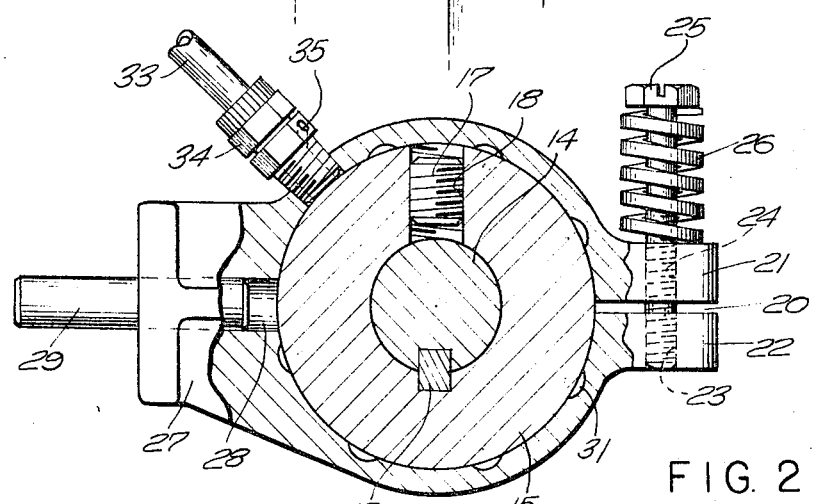
FIG. 2 is an enlarged transverse section thereof.

In accordance with our present invention, oil is transmitted to the brake surface by a plurality of transverse grooves 31 inside the brake band 19 as shown in FIGS. 2 and 3. The grooves 31 do not extend completely across the width of the band 19 and are therefore closed at each end. For best results the grooves are generally of oval section approximately 1/32 of an inch in depth and 3/16 inch in width. We also provide an oil cup 32 mounted above the brake and connected to a flexible tube 33 to a fitting 34 extending into an opening in the brake band 19. The oil cup 32 is of a type which can be adjusted to deliver a fixed amount of oil. For the purposes of the present invention it has been found three to four drops per minute produces the desired results. It has also been found that it is desirable to provide a vent 35 in the fitting 34 extending angularly towards the brake band so that the oil will go by the vent 35 but any surplus oil or pressure will back up and out of the vent.

In operation it has been found that the brake of the present invention can be tightened to provide 240 inch pounds torque on the shaft 14. The maximum temperature which the friction will produce is approximately 150° F. up to 1000 movements per minute with a one inch peripheral movement at each stroke. All this is accomplished by providing the proper oil along the surface of the band and the drum. The grooves 31 become filled with oil, and the ¼ inch space on the top of the Allen screw 17 together with the depression in the screw itself serves to carry just enough oil around and deposit it into the grooves 31. Thus there is a constant reservoir of oil completely around the drum and the braking is actually against a film of oil. Furthermore with this construction there are no high spots and the drum and brake band fit tightly against each other. It has been found that by using a bronze alloy band and a polished steel drum, the parts will wear into each other in a very short time so that the braking action is completely across the entire surface of the band and drum rather than in spots. Furthermore, the pressure provided by tightening the bolt 25 and spring 26, is maintained during lengthy runs. It is unnecessary to constantly correct the pressure as is the case with the cloth type brakes.

The brake of the present invention can be produced in varying sizes to fit different needs. For example in the case of a large high speed feed device such as is partially illustrated in FIG. 1, a small brake may be positioned at the upper roller as shown and a larger brake can be mounted on the lower roller adjacent the feed. This eliminates all inertia in the system regardless of the high speed operation. The brake is simple in construction and easy and economical to manufacture and assemble. Other advantages of the present invention will be readily apparent to a person skilled in the art.

We claim:

1. An inertia brake for an intermittently rotating shaft comprising a cylindrical drum keyed to the shaft, a metallic brake band surrounding said drum, said band having a transverse gap, means for adjusting said gap to adjust the pressure of said band on said drum, and means for supplying a predetermined flow of lubricating oil between said drum and said band, said band having a plurality of internal transverse spaced grooves, said drum having an axial opening, and a set screw in said opening bearing against the shaft, said screw being recessed in said opening to define an oil reservoir in said drum above said screw.

2. An inertia brake for an intermittently rotating shaft comprising a cylindrical drum keyed to the shaft, a metallic brake band surrounding said drum, said band having a transverse gap, means for adjusting said gap to adjust the pressure of said band on said drum, and means for supplying a predetermined flow of lubricating oil between said drum and said band, said band having a plurality of internal transverse spaced grooves extending less than the width of said band to provide a closure at the end of each groove, said drum having an axial opening, and a set screw in said opening bearing against the shaft, said screw being recessed in said opening to define an oil reservoir in said drum above said screw.

3. An inertia brake for an intermittently rotating shaft comprising a cylindrical drum keyed to the shaft, a metallic brake band surrounding said drum, said band having a transverse gap, means for adjusting said gap to adjust the pressure of said band on said drum, and means for supplying a predetermined flow of lubricating oil between said drum and said band, said band having a plurality of internal transverse spaced grooves, said drum having an axial opening, and a set screw in said opening bearing against the shaft, said screw being recessed in said opening to define an oil reservoir in said drum above said screw, said adjusting means including aligned lugs extending from the edges of said gap, a bolt extending through one lug and threadedly engaging the other lug, and a coil spring between the first lug and the head of said bolt.

4. An inertia brake for an intermittently rotating shaft comprising a cylindrical drum keyed to the shaft, a metallic brake band surrounding said drum, said band having a transverse gap, means for adjusting said gap to adjust the pressure of said band on said drum, and means for supplying a predetermined flow of lubricating oil between said drum and said band, said band having a plurality of internal transverse spaced grooves extending less than the width of said band to provide a closure at the end of each groove, said drum having an axial opening, and a set screw in said opening bearing against the shaft, said screw being recessed in said opening to define an oil reservoir in said drum above said screw, said adjusting means including aligned lugs extending from the edges of said gap, a bolt extending through one lug and threadedly engaging the other lug, and a coil spring between the first lug and the head of said bolt.

5. An inertia brake for an intermittently rotating shaft comprising a cylindrical drum keyed to the shaft, a metallic brake band surrounding said drum, said band having a transverse gap, means for adjusting said gap to adjust the pressure of said band on said drum, and means for supplying a predetermined flow of lubricating oil between said drum and said band, said band having a plurality of internal transverse spaced grooves, said drum having an axial opening, and a set screw in said opening bearing against the shaft, said screw being recessed in said opening to define an oil reservoir in said drum above said screw, said oil supply means including a fitting in said band, an oil cup, a pipe connecting said oil cup and said fitting, and means for adjusting the rate of flow from said oil cup.

6. An inertia brake for an intermittently rotating shaft comprising a cylindrical drum keyed to the shaft, a metallic brake band surrounding said drum, said band having a transverse gap, means for adjusting said gap to adjust the pressure of said band on said drum, and means for supplying a predetermined flow of lubricating oil between said drum and said band, said band having a plurality of internal transverse spaced grooves extending less than the width of said band to provide a closure at the end of each groove, said drum having an axial opening, and a set screw in said opening bearing against the shaft, said screw being recessed in said opening to define an oil reservoir in said drum above said screw, said oil supply means including a fitting in said band, an oil cup, a pipe connecting said oil cup and said fitting, and means for adjusting the rate of flow from said oil cup.

References Cited by the Examiner

UNITED STATES PATENTS

| | | | |
|---|---|---|---|
| 165,290 | 7/1875 | Williams | 188—83 |
| 254,771 | 3/1882 | Jackson | 308—124 X |
| 634,204 | 10/1899 | Diehl | 74—595 X |
| 767,845 | 8/1904 | Spears | 308—124 |
| 886,643 | 5/1908 | Sans. | |
| 914,520 | 3/1909 | Salmon | 308—77 |
| 1,271,163 | 7/1918 | Hartford | 188—264 |
| 1,498,877 | 6/1924 | Knee et al. | 188—264 X |
| 1,882,037 | 10/1932 | Roberts | 188—264 X |
| 2,168,284 | 8/1939 | Crane et al. | 188—83 X |

FOREIGN PATENTS 350,844  6/1931  Great Britain.

MILTON BUCHLER, *Primary Examiner.*

FERGUS S. MIDDLETON, *Examiner.*

G. E. A. HALVOSA, *Assistant Examiner.*